United States Patent
Kuroda et al.

(10) Patent No.: US 9,413,173 B2
(45) Date of Patent: Aug. 9, 2016

(54) POWER CONVERSION DEVICE, CONTROL DEVICE FOR POWER CONVERSION DEVICE, AND CONTROL METHOD FOR POWER CONVERSION DEVICE

(75) Inventors: Eisuke Kuroda, Hitachi (JP); Yasuo Sato, Hitachinaka (JP); Masahiro Watanabe, Hitachi (JP); Taichiro Kawahara, Tokai (JP)

(73) Assignee: Hitachi, Ltd., Tokyo (JP)

( * ) Notice: Subject to any disclaimer, the term of this patent is extended or adjusted under 35 U.S.C. 154(b) by 292 days.

(21) Appl. No.: 13/993,804

(22) PCT Filed: Dec. 1, 2011

(86) PCT No.: PCT/JP2011/077816
§ 371 (c)(1),
(2), (4) Date: Jun. 13, 2013

(87) PCT Pub. No.: WO2012/081412
PCT Pub. Date: Jun. 21, 2012

(65) Prior Publication Data
US 2013/0265030 A1    Oct. 10, 2013

(30) Foreign Application Priority Data
Dec. 16, 2010  (JP) ................. 2010-279998

(51) Int. Cl.
*H02J 3/24* (2006.01)
*G06Q 10/06* (2012.01)
*G06Q 50/06* (2012.01)
*H02J 3/38* (2006.01)

(52) U.S. Cl.
CPC . *H02J 3/24* (2013.01); *G06Q 10/06* (2013.01); *G06Q 50/06* (2013.01); *H02J 3/386* (2013.01); *H02J 3/383* (2013.01); *Y02E 10/563* (2013.01); *Y02E 10/763* (2013.01); *Y04S 10/54* (2013.01)

(58) Field of Classification Search
CPC ........................................................ H02J 3/14
See application file for complete search history.

(56) References Cited

U.S. PATENT DOCUMENTS 5,617,012 A * 4/1997 Murakami .................. 323/207
5,923,158 A * 7/1999 Kurokami et al. ............ 323/299
6,252,753 B1 * 6/2001 Bhargava ...................... 361/62

(Continued)

FOREIGN PATENT DOCUMENTS

CN    1180261 A    4/1998
EP    2 194 656 A1    6/2010

(Continued)

OTHER PUBLICATIONS

Adibi, M. M., and R. J. Kafka. "Power system restoration issues." Computer Applications in Power, IEEE 4.2 (1991): 19-24.*

(Continued)

*Primary Examiner* — Sean Shechtman
*Assistant Examiner* — David Wynne
(74) *Attorney, Agent, or Firm* — Crowell & Moring LLP (57) ABSTRACT

A command system of a power conditioning system of the present invention receives return pattern information including a time instance and an upper output limit, and issues a command with respect to the upper output limit of the power conditioning system, the return pattern information being for preventing the frequency of an isolated power system, which is calculated by a planning server, from causing a sharp change.

6 Claims, 12 Drawing Sheets

(56) References Cited

U.S. PATENT DOCUMENTS

| | | |
|---|---|---|
| 6,351,400 B1* | 2/2002 | Lumsden .................. 363/95 |
| 6,429,546 B1* | 8/2002 | Ropp et al. ................ 307/31 |
| 2007/0127177 A1* | 6/2007 | Benton et al. ............. 361/90 |
| 2007/0241759 A1* | 10/2007 | Williams ............. G01R 27/32 324/600 |
| 2008/0120080 A1* | 5/2008 | Nasle .................... G05B 17/02 703/13 |
| 2008/0225452 A1 | 9/2008 | Stoupis et al. |
| 2008/0296898 A1* | 12/2008 | Ichinose et al. ............. 290/44 |
| 2010/0008119 A1* | 1/2010 | O'Brien et al. ............ 363/132 |
| 2010/0078940 A1* | 4/2010 | Kondo et al. ................ 290/44 |
| 2011/0107123 A1* | 5/2011 | Nishimura et al. ......... 713/300 |
| 2011/0190958 A1* | 8/2011 | Hirst ........................ 700/295 |
| 2012/0010758 A1* | 1/2012 | Francino et al. ........... 700/291 |

FOREIGN PATENT DOCUMENTS

| | | |
|---|---|---|
| JP | 57-211940 A | 12/1982 |
| JP | 8-256436 A | 10/1996 |
| JP | 2000-69675 A | 3/2000 |
| JP | 2004-260913 A | 9/2004 |
| JP | 2008-5638 A | 1/2008 |
| JP | 2009-219238 A | 9/2009 |
| WO | WO 03/071655 A1 | 8/2003 |
| WO | WO 2010/086032 A2 | 8/2010 |

OTHER PUBLICATIONS

Toune, Sakae, et al. "Comparative study of modern heuristic algorithms to service restoration in distribution systems." Power Delivery, IEEE Transactions on 17.1 (2002): 173-181.*

Wakileh, Jiryes J., and Anil Pahwa. "Distribution system design optimization for cold load pickup." Power Systems, IEEE Transactions on 11.4 (1996): 1879-1884.*

Hsu, Yuan-Yih, et al. "Distribution system service restoration using a heuristic search approach." Transmission and Distribution Conference, 1991., Proceedings of the 1991 IEEE Power Engineering Society. IEEE, 1991.*

Kim, Hoyong, Yunseok Ko, and Kyung-Hee Jung. "Algorithm of transferring the load of the faulted substation transformer using the best-first search method." Power Delivery, IEEE Transactions on 7.3 (1992): 1434-1442.*

Erika Twining, Donald Grahame Holmes, Grid Current Regulation of a Three-Phase Voltage Source Inverter With an LCL Input Filter, May 2003, IEEE Transactions on Power Electronics, vol. 18, No. 3.*

Chinese Office Action dated Nov. 3, 2014, including partial English-language translation (ten (10) pages).

Corresponding International Search Report with English Translation dated Feb. 7, 2012 (three (3) pages).

Extended European Search Report issued in counterpart European Application No. 11848670.3 dated Apr. 5, 2016 (9 pages).

* cited by examiner

CALCULATION EXAMPLE OF RETURN PATTERN OF POWER CONDITIONING SYSTEM

EXAMPLE OF DISPLAY SCREEN OF NORMAL RETURN PATTERN OF POWER CONDITIONING SYSTEM

EXAMPLE OF DISPLAY SCREEN OF ABNORMAL RETURN PATTERN OF POWER CONDITIONING SYSTEM

CALCULATION EXAMPLE OF RETURN PATTERN OF POWER CONDITIONING SYSTEM

FIG.11B

POWER CONVERSION DEVICE, CONTROL DEVICE FOR POWER CONVERSION DEVICE, AND CONTROL METHOD FOR POWER CONVERSION DEVICE

TECHNICAL FIELD

The present invention relates to power conversion devices or power conditioning systems, control devices or control equipments for a power conditioning system, and control methods for a power conditioning system.

BACKGROUND ART

An electric power system is controlled so that an electric power supplied to this electric power system balances with a power consumption of a load coupled to this electric power system. However, when a system failure of the electric power system occurs and for example an isolated power system is generated in the electric power system, the supply and demand are temporarily unbalanced and thereby the frequency of the electric power system will deviate from a predetermined frequency.

Therefore, as described in JP-A-57-211940, a technique has been invented for adjusting the supply-and-demand unbalance within an isolated power system by shutting off a power source or a load by online control and thus maintaining the frequency.

CITATION LIST

Patent Literature

Patent Literature 1 JP-A-57-211940

SUMMARY OF INVENTION

Technical Problem

On the other hand, power sources, such as a photovoltaic generation device and a wind power generation device, via a power conditioning system are assumed to be introduced in large numbers. The power conditioning system coupled to a photovoltaic generation device or a wind power generation device is supposed to be shut off in the event of a system failure and return in a predetermined time, for the purpose of protecting the devices.

This return timing usually occurs in a fixed time from the occurrence of a system failure. In the case where the power sources, such as a photovoltaic generation device and a wind power generation device, via a power conditioning system are introduced in large numbers, when the power sources are shut off for the purpose of protecting devices and return in a certain time, the power sources will return intensively at a predetermined timing. Accordingly, an influence on the electric power system related to the return will increase, and therefore a sharp change might be caused in the frequency of an isolated power system and depart from the upper/lower limits.

The present invention has been made in view of the above circumstances, and provides: a power conditioning system coupled to a photovoltaic generation device, a wind power generation device, or the like, the power conditioning system being capable of introducing a photovoltaic generation device, a wind power generation device, or the like so as not to affect a system fluctuation in the frequency or the like in the event of a system failure; a control equipment for the power conditioning system; and a control method for the power conditioning system.

Solution to Problem

In order to achieve the above-described purpose, the power conditioning system according to the present invention includes: an output suppression control section that reduces an output based on fluctuation information of an electric power system; and a return control section that increases the output in a predetermined return pattern after the output decreases, wherein the return pattern is formed so as to be variable by external instruction information.

Alternatively, the power conditioning system according to the present invention includes: a return pattern generation section that prepares the return pattern information so as to increase the output of the power conditioning system in a predetermined return pattern after a decrease in the output of the power conditioning system associated with the fluctuation information of the electric power system; and a transmitter transmitting the return pattern information.

Advantageous Effects of Invention

According to the present invention, a fluctuation amount due to a supply-and-demand unbalance of an electric power system can be reduced.

The other purposes, features, and advantages of the present invention will become clear from the description of the following embodiments of the present invention related to the accompanying drawings.

DESCRIPTION OF EMBODIMENTS

Hereinafter, the embodiments of the present invention will be described.

Figure 1:
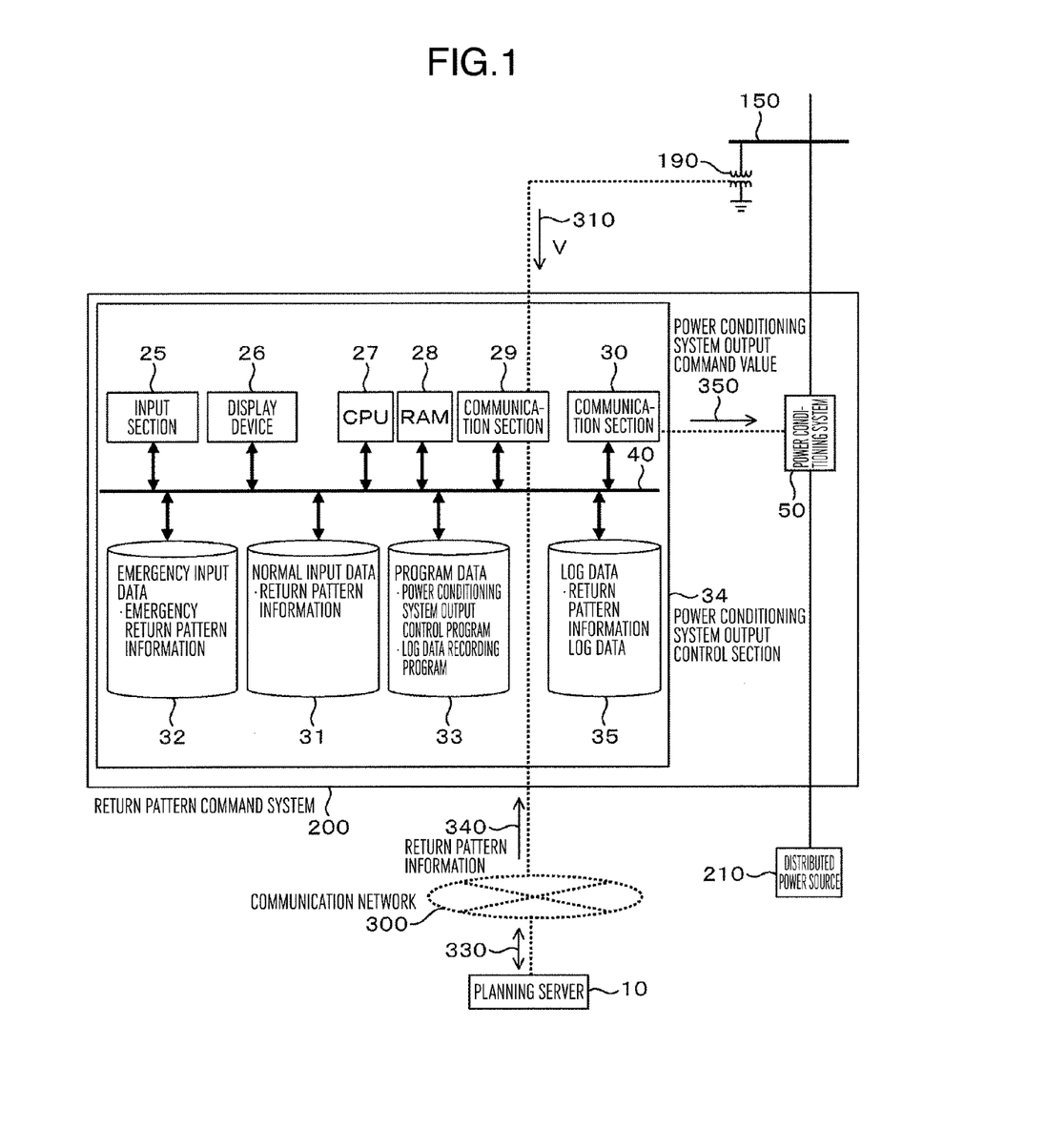
FIG. 1 shows a return pattern command system in a power conditioning system according to a first embodiment of the present invention, the return pattern command system receiving return pattern information from a planning server, transmitting an output command value, and controlling the power conditioning system.

FIG. 1 is a view showing a first embodiment of the present invention. A return pattern command system 200 is described using FIG. 1. FIG. 1 is a view showing a configuration of a planning server 10, a communication network 300, the return pattern command system 200, a node 150, and a distributed power source 210. The distributed power source 210 is a power generation device utilizing natural energy of a photovoltaic generation device, a wind power generation device, or the like, and such energy is hereinafter referred to as renewable energy. The return pattern command system 200 includes a power conditioning system output control section 34 and a power conditioning system 50 coupled to a communication section 30 via a communication network 300, as indicated by the dotted lines in FIG. 1. The power conditioning system 50 is coupled to the distributed power source (generator) 210 via a node (bus) 150 and a line coupling these, and to the communication section 30 of the power conditioning system output control section 34 via the communication network, as indicated by the dotted lines in FIG. 1. In the return pattern command system 200, there is a sensor 190 in the vicinity of the node 150, and the sensor 190 is coupled to the communication section 29 of the power conditioning system output control section 34 via the communication network 300, as indicated by the dotted lines in FIG. 1. Return pattern information 340 prepared by the planning server 10 is sent to the return pattern command system 200 via the communication network 300.

Next, the configuration of the power conditioning system output control section 34 is described. An input section 25, such as a keyboard or a mouse, a display device 26, a computer or computer server (CPU) 27, a memory (RAM) 28, a communication section 29, a communication section 30, and various databases (a normal input database 31, an emergency input database 32, a program database 33, and a log database 35) are coupled to a bus 40. The computer or computer server (CPU) 27 carries out an indication of image data to be displayed, a search of data within the various databases, and the like by executing a calculation program read from the program database 33 to the RAM 28. The RAM 28 is a memory for temporarily storing: input/output data, such as image data for display, return pattern information, emergency return pattern information, and return pattern information log data; and record data. Here, necessary image data is generated by CPU 27 and is displayed on the display device 26 (e.g., on a display screen).

Into the memory in the power conditioning system output control section 34, five main databases are stored. Input data, such as time series data of a gate block time, a gate deblock time, and an output limiter command value of the power conditioning system 50, is stored into the normal input database 31. The input data is transmitted via the communication network 300, a communication section 13 (illustrates in FIG. 2) of the planning server 10, and the communication section 29 of the power conditioning system output control section 34. Into the emergency input database 32, input data, such as time series data of a gate block time, a gate deblock time, and an output limiter command value of the power conditioning system, as default return pattern information of the power conditioning system 50, is stored when the return pattern information from the planning server 10 cannot be obtained due to a communication failure or an unexpected failure. Into the program database 33, a power conditioning system output control program and a log data recording program that are analysis programs are stored. These programs are read to CPU 27 as required and are executed for analysis or calculation. Into the log database 35, information (node voltage V) and return pattern information from the sensor 190 are stored when the log data recording program is executed.

Figure 2:
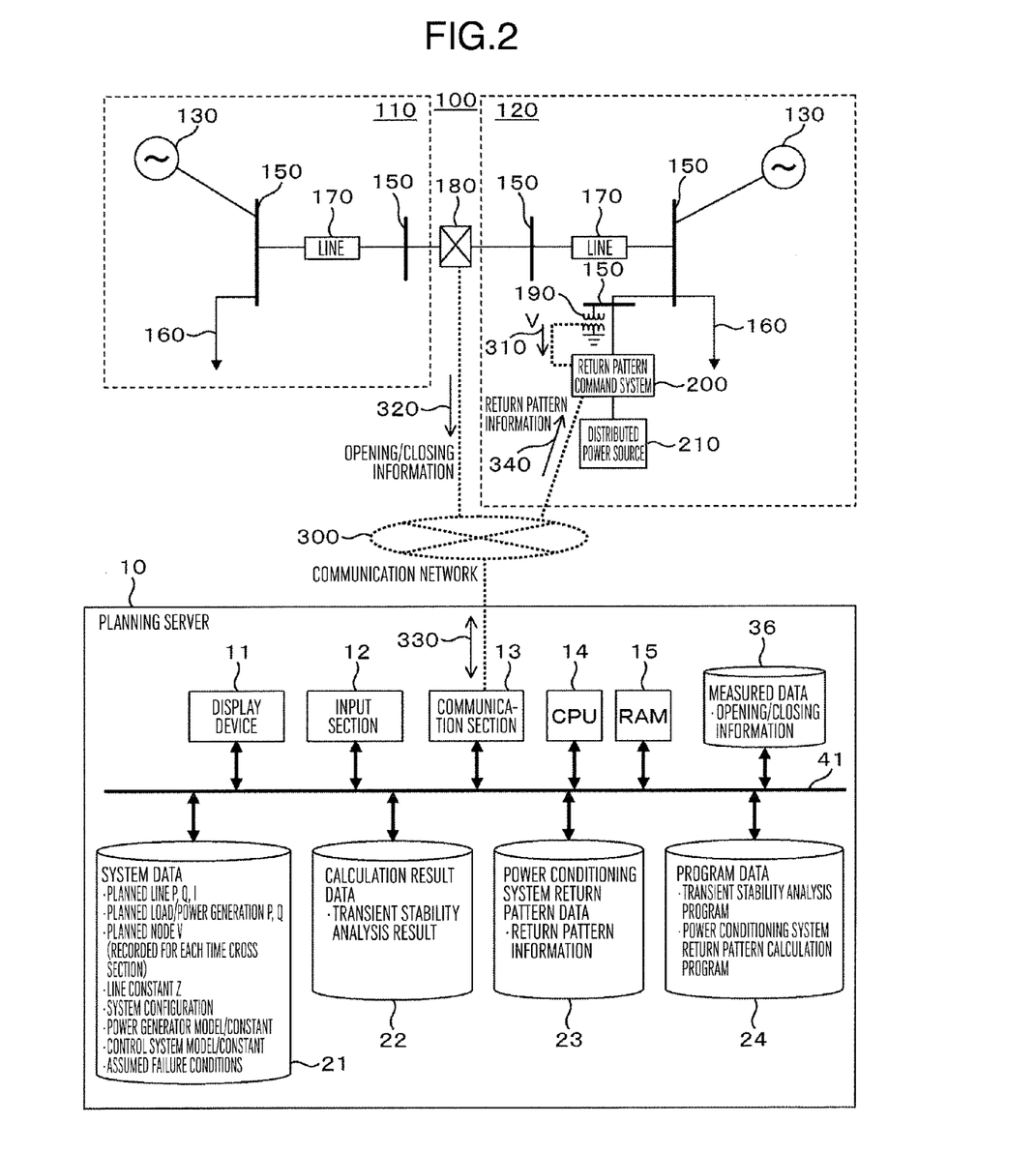
FIG. 2 is an overall view of the planning server calculating the return pattern information and an electric power system, according to the first embodiment of the present invention.

Next, FIG. 2 is a view showing the configuration of the communication network 300 that links an electric power system 100 comprising a bulk power system 110 and an isolated power system 120, the planning server 10, a breaker 180, and the return pattern command system 200. The electric power system 100 comprises a power generator 130, the node (bus) 150, a line 170 coupling these, the distributed power source 210 coupled to the node 150 via the return pattern command system 200, a load 160, and the breaker 180 coupled between the lines between the nodes 150 of the bulk power system 110 and the nodes 150 of the isolated power system 120. The breaker 180 sends opening/closing information 320 to the planning server 10 via the communication network 300. The return pattern command system 200 has the sensor 190 at its own node 150, and receives the return pattern information 340 from the planning server 10 via the communication network 300. The sensor 190 measures a node voltage V 310, and sends this information to the return pattern command system 200 via the communication network.

Next, the configuration of the planning server 10 is described. The display device 11, the input sections 12, such as a keyboard or a mouse, the communication section 13, the computer or computer server (CPU) 14, the memory (RAM) 15, and various databases (a system database 21, a calculated-result database 22, and the power conditioning system return pattern database 23, a program database 24, and a measurement database 36) are coupled to the bus 41. The computer or computer server (CPU) 14 executes the analysis programs (a transient stability analysis program and a power conditioning system return pattern calculation program) read from the program database 24 to the RAM 15, and carries out an indication of image data to be displayed, a search of data within various databases, and the like. The RAM 15 is a memory for temporarily storing calculated temporary data and calculation result data, such as image data for display, a transient stability analysis result, and the return pattern information of the power conditioning system. Here, necessary image data is generated by CPU 14 and is displayed on the display device 11 (e.g., on a display screen).

Into the planning server 10, five main databases are stored. In the system database 21, there are stored information, such as a node voltage V, a current I of a line, an active power P, a reactive power Q for each planned time cross section of the electric power system 100, an active power P and reactive power Q of a load or a power generation device, a line constant Z(=R+jX) indicative of an impedance of the line 170, a load/amount of electrical generation, system configuration data representing the connection status of lines and/or nodes of the system, a power generator model/constants, a control system model/constants, and an assumed fault condition. The opening/closing information 320 detected by the breaker 180 is stored into the measurement database 36. The opening/closing information 320 is transmitted to the communication section 13 of the planning server 10 via the communication network 300. In the calculated-result database 22, there are stored a node voltage V, the current I, active power P, and reactive power Q of a line, the active power P and reactive power Q of a load, line constants, which are the results of power flow analysis and transient stability analysis; and calculation results, such as an internal phase angle δ, angular velocity deviation Δω, active power P, reactive power Q of a power generator; a frequency f of a node, time series data of the output P of the power conditioning system. The calculation results of return pattern information (a gate block time, a gate deblock time, and the output time-series waveform data of the power conditioning system) of the power conditioning system are stored into the power conditioning system return pattern database 23. Into the program database 24, a power flow analysis programs, a state estimation analysis program, a transient stability analysis program, and a power conditioning system return pattern analysis program that are analysis program are stored. These programs are read to CPU 14 as required and are executed for analysis or calculation.

Figure 3:
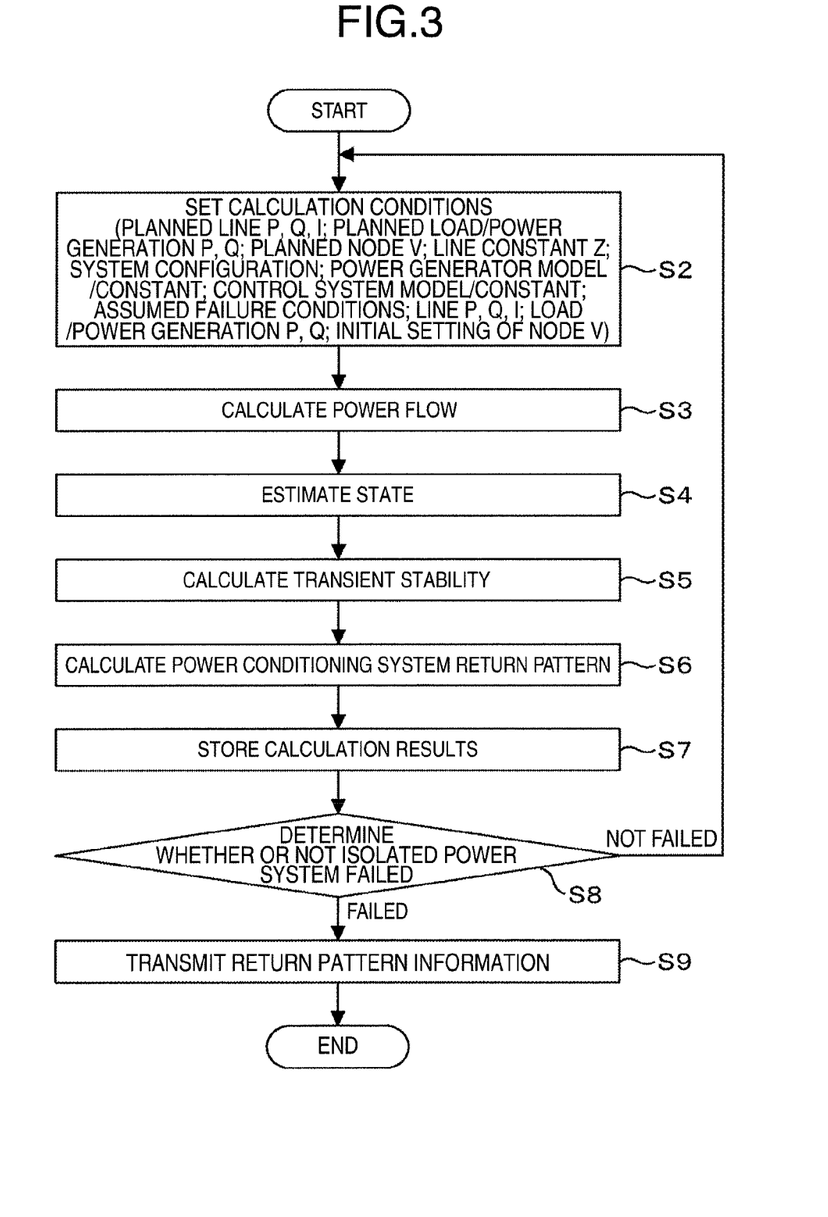
FIG. 3 is a flow chart showing a return pattern information generation and transmission algorithm of the power conditioning system in the first embodiment of the present invention.

Next, the contents of a calculation process of the planning server 10 are described. FIG. 3 is a flow chart showing a return pattern information generation and transmission algorithm of the power conditioning system. Here, a processing flow is described, including: with the use of system data and planning data, a step of calculating an power flow; a step of estimating a state; with regard to an assumed failure case set in the database, a step of calculating transient stability and a step of calculating a return pattern of the power conditioning system; a step of storing calculation results; and assuming a case where an isolated power system failure occurred at a certain time, a step of transmitting return pattern information.

First in Step S2, system conditions are set. Here, a line impedance Z(=R+jX) and the initial values of a planned load/amount of electrical generation P, Q required for the power flow analysis and the generator model/constants and control-system model/constants required for the transient stability analysis are read from system data 21 or from a user input of the input section 12 to the RAM 15. In Step S3, power flow analysis is performed using the data set in Step S2, the voltage and line flow (active/reactive power flow, a line current, etc.) of each node are calculated, and the calculation results are stored into the RAM 15. In Step S4, the data for each time cross section stored in the system data 21 is read to the RAM 15, and state estimation analysis is performed using the results of the power flow analysis calculated in Step S3. This state estimation analysis is performed assuming that associated with the occurrence of a failure at a time instance $t_C$, as shown in a dotted line of FIG. 5B, the output [p.u.] of each power conditioning system generally controlled by the system becomes 0.00, and returns like a point C at a time instance $t_A$, and then at a time instance $t_B$ the output [p.u.] becomes 0.10 like a point D.

Note that, for the data serving as the base of the state estimation analysis, each sensor output value when the occurrence of a failure is detected (at $t_C$ of FIG. 5A) is used.

The state estimation analysis refers to a calculation function to, based on the observational data of power transmission/distribution devices, including a substation, a power station, and a power transmission line, and on the connection data, determine whether or not there is abnormal data in the observation data, remove the abnormal data if there is any, and estimate a plausible system state in a specific time cross section.

Here, the state estimation analysis and the power flow analysis differs as follows. In the power flow analysis, assuming there is no error in input data, the redundancy is 1.0, abnormal data is not removed, input data includes facility constants (r, x, y/2, tap ratio), power generator P, V, and load P, Q, and the Newton-Raphson method is used as the calculation algorithm, while in the state estimation, for the error in input data, assuming there is an error (an error of a measuring instrument, an error due to a communication delay) in observation data (PQ: equal to or less than ±3%, V: equal to or less than ±1%), the redundancy is desirably equal to or greater than 1.2, abnormal data is removed, input data includes facility constants (r, x, y/2, tap ratio), power generator P, V, load P, Q, and a weighting factor of an observed value, and the least square method is used as the calculation algorithm.

With regard to an error in input data, the followings are assumed, for example. In a model system, for a variable to be calculated, in the power flow analysis, there is no "error" in data, while in the state estimation, because data is a "measured value", the measured value includes a "measurement error" (hereinafter, a measured value is referred to as a "observed value").

The state estimation analysis is performed in accordance with the various methods, e.g., Lars Holten, Anders Gjelsvlk, Sverre Adam, F. F. Wu, and Wen-Hs Jung E. Liu, and Comparison of Different Methods for State Estimation. IEEE Trans. Power Syst., 3(1988), 1798-1806, and the like. Here, a result of the state estimation analysis is obtained, for example, by calculating each time cross section for each 100 msec from a time instance 0.0 sec to a time instance 10.0 sec, as a frequency deviation [Hz], as shown by a dotted line of FIG. 5A, In Step S5, the state estimation result calculated in Step S4, the power generator model/constants, and the control-system model/constants are read to the RAM 15, and transient stability analysis is performed. In Step S6, the transient stability analysis result calculated in Step S5 is read to the RAM 15, and power conditioning system return pattern calculation is performed. The detail of the calculation method is described later. In Step S7, the transient stability analysis result calculated in Step S5 and Step S6 are stored into the calculation result database 22, and the return pattern calculation result of the power conditioning system is stored into the power conditioning system return pattern database 23. In Step S8, it is determined using break information of the breaker 180 whether an isolated power system failure has occurred, and if the isolated power system failure has not occurred, the flow returns to Step 1, while if the isolated power system failure has occurred, the flow proceeds to Step S9. In Step S9, the time series data of the gate block time and gate deblock time and an output limiter command value stored in the power conditioning system return pattern database 23 are transmitted to the communication section 29 via the communication section 13 and the communication network 300, and the flow is complete.

Figure 4:
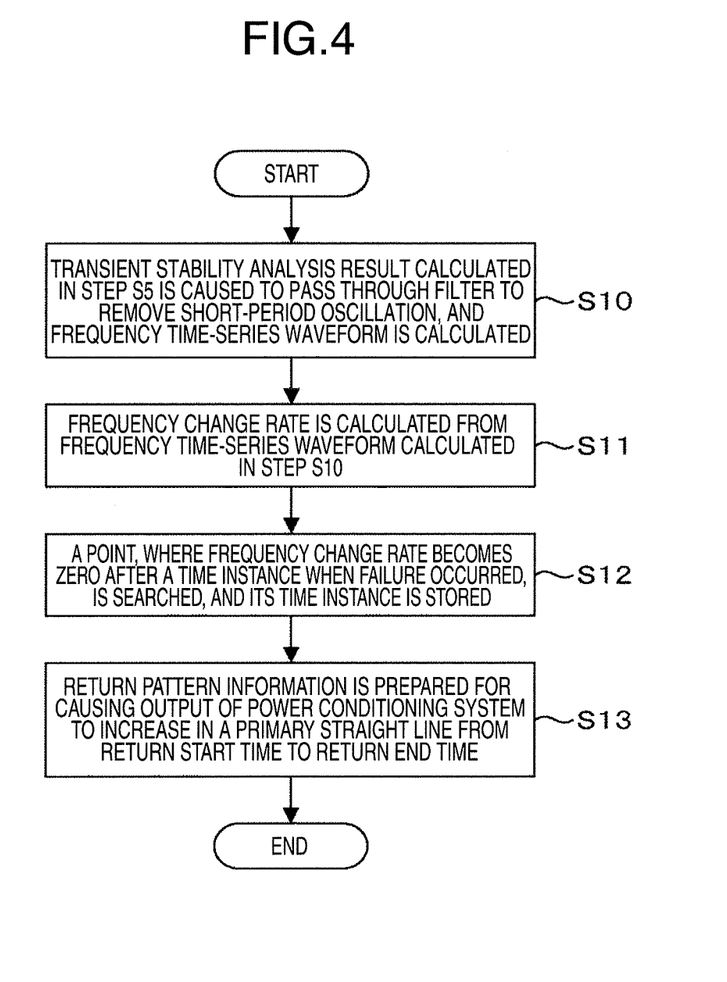
FIG. 4 is a flow chart showing an algorithm for calculating a return pattern of the power conditioning system in the first embodiment of the present invention.
Figure 5A:
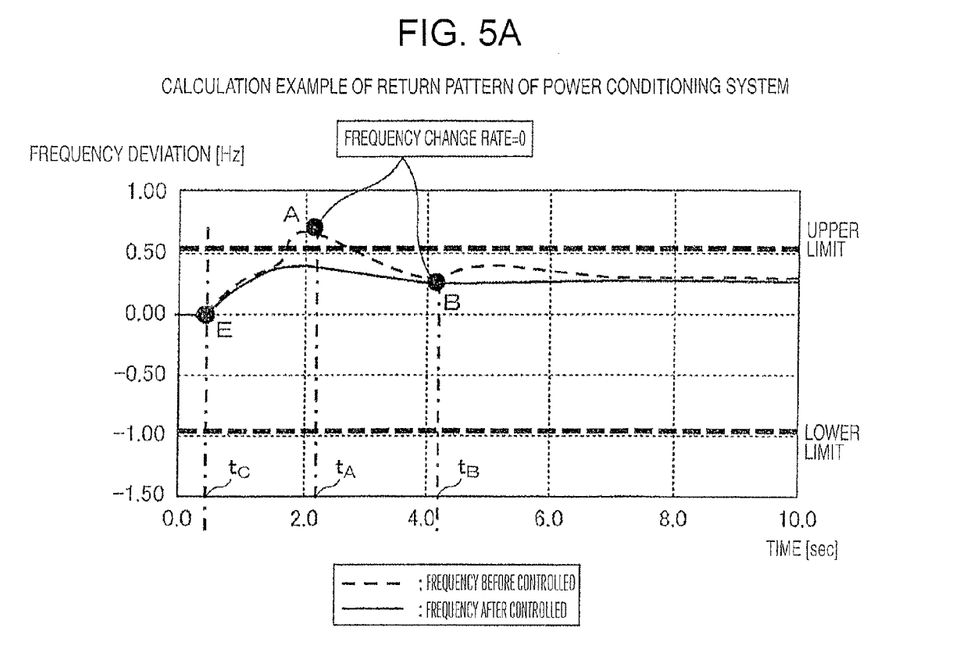
FIG. 5A shows an example of a time-series waveform of a frequency deviation calculated in the first embodiment of the present invention.
Figure 5B:
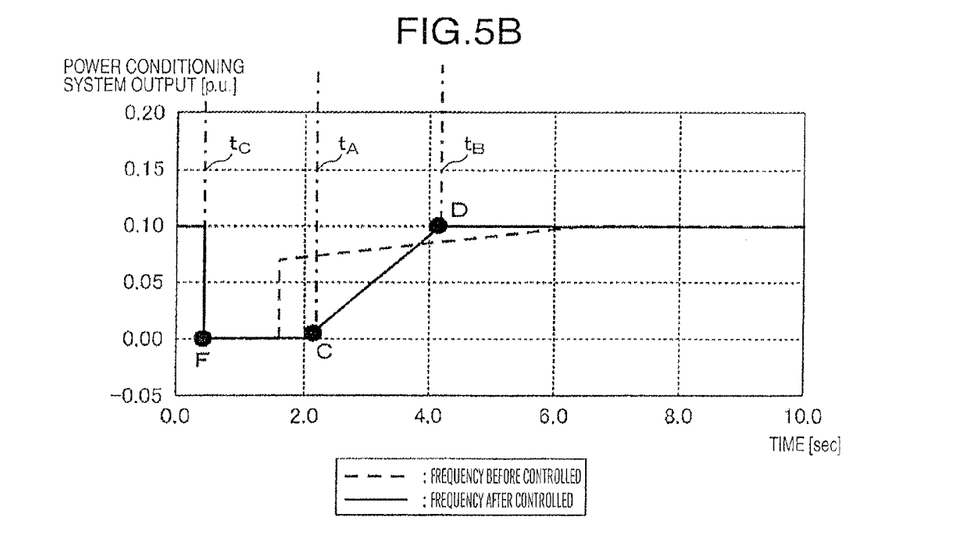
FIG. 5B shows an example of a time-series waveform of the output of the power conditioning system calculated in the first embodiment of the present invention.

Next, Step S6 is described using FIG. 4 and FIGS. 5A, 5B. FIG. 4 is a flow chart showing an algorithm for calculating the return pattern of the power conditioning system.

First, in Step S10, a time-series waveform of the frequency f among the transient stability analysis results calculated in Step S5 is caused to pass through a low pass filter to remove a short-period oscillating noise, and a resulting frequency time-series waveform is read to the RAM 15. In Step S11, a frequency change rate is calculated from the frequency time-series waveform calculated in Step S10. In Step S12, a point where the frequency change rate becomes zero is searched, and its time instance is stored. For example, the time instance $t_A$ of a point A and the time instance $t_B$ of a point B of FIG. 5A are stored. In Step S13, return pattern information is prepared for causing the output of the power conditioning system to increase in a primary straight line from a return start time to a return end time. For example, the return pattern information is prepared for causing the output of the power conditioning system from the time instance $t_A$ of the point A and the time instance $t_B$ of the point B of FIG. 5B to increase in a primary straight line from a point C to a point D (a solid line of FIG. 5B).

Figure 6:
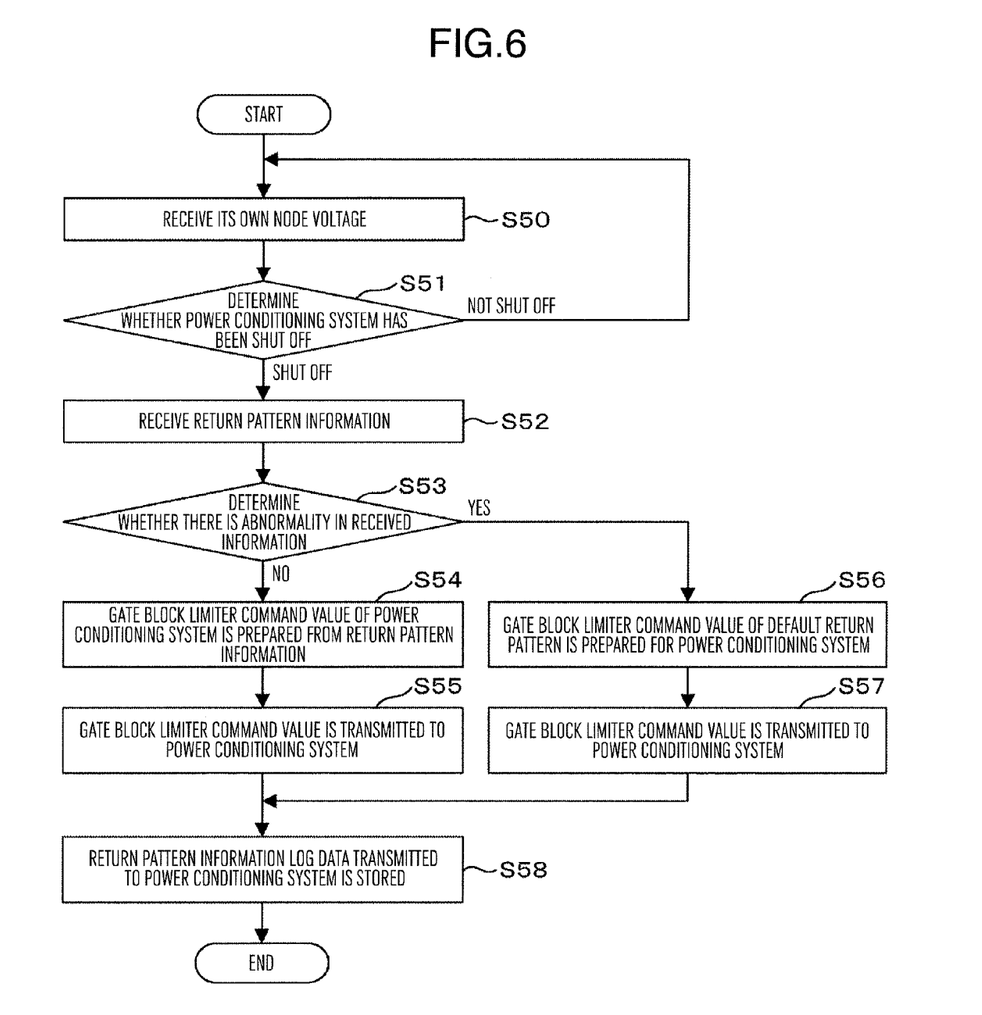
FIG. 6 is a flow chart showing an output control processing algorithm of a return pattern command system in the first embodiment of the present invention.

Next, the contents of the calculation process of the power conditioning system output control section 34 are described. FIG. 6 is a flow chart showing an output control processing algorithm of the return pattern command system. Here, a processing flow is described, including: a step of receiving the voltage V310 of the (its own) node 150 of the power conditioning system 50 and the return pattern information 340 transmitted via the communication network 300 from the planning server; a step of determining whether or not the power conditioning system has been shut off; a step of determining whether or not there is abnormality in receipt information; and a step of changing the return pattern depending on the presence or absence of abnormality in the receipt information.

First, in Step S50, the information on the node 150 of the power conditioning system is collected. Here, the voltage V310 of the node 150 required to determine that a voltage drop has occurred at the node 150 of the power conditioning system as a result of the occurrence of a failure is measured using the sensor 190, and is collected by the communication section 29 via the communication network and stored into the RAM 28. In Step S51, it is determined whether or not the power conditioning system 50 has been shut off due to a failure. Here, it is determined, by the voltage V310 of the node 150 held in the RAM 28 in Step S50, whether or not the power conditioning system has been shut off for the purpose of protecting various devices. Here, the power conditioning system output control section 34, upon detection a decrease of the voltage V310 of the node 150 down to less than 30 V (60 V) that is 30% of a normal voltage 100 V (or 200 V), outputs to the power conditioning system 50 a command for stopping the operation (setting the power conditioning system output [p.u.] to 0.00).

Figure 9A:
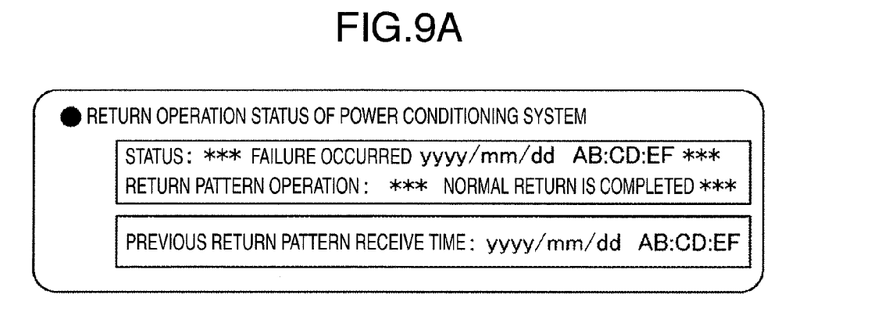
FIG. 9A shows an example of the display screen that is a screen interface of the device in the first embodiment of the present invention.
Figure 9B:
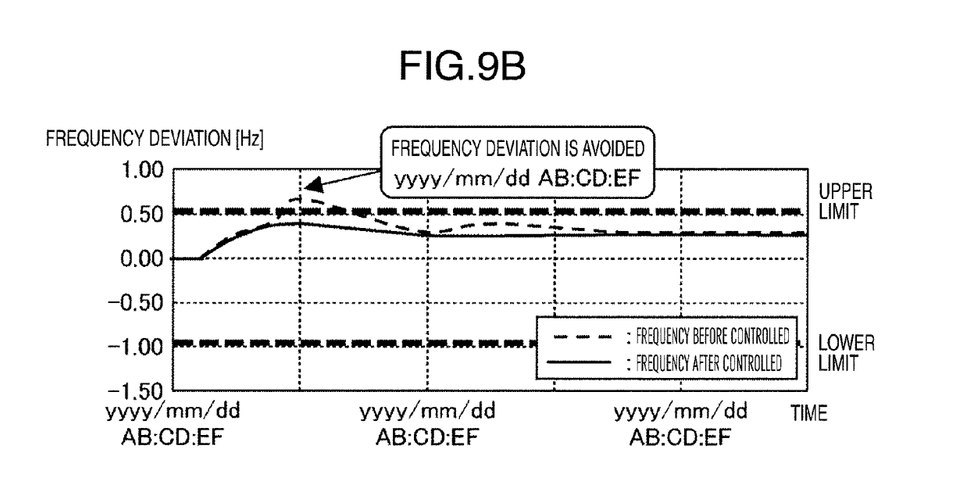
FIG. 9B shows an example of the display screen that is a screen interface of the device in the first embodiment of the present invention.
Figure 9C:
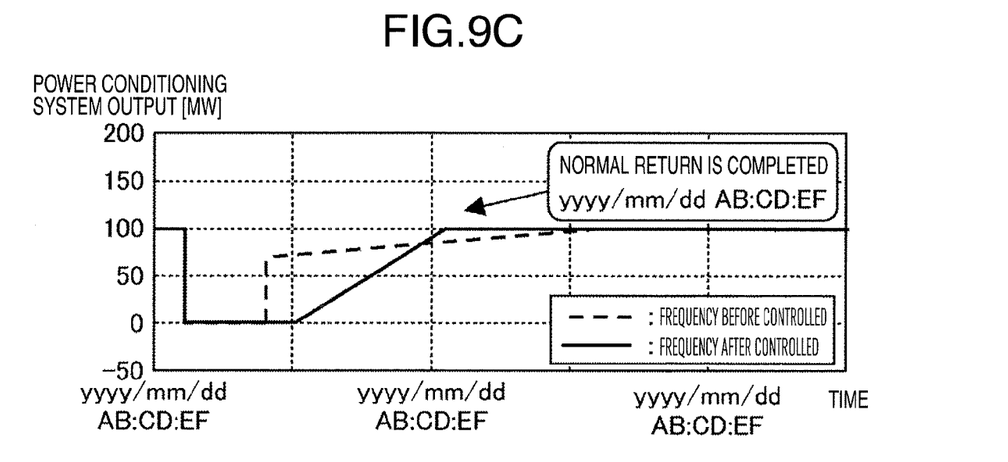
FIG. 9C shows an example of the display screen that is a screen interface of the device in the first embodiment of the present invention.
Figure 9D:
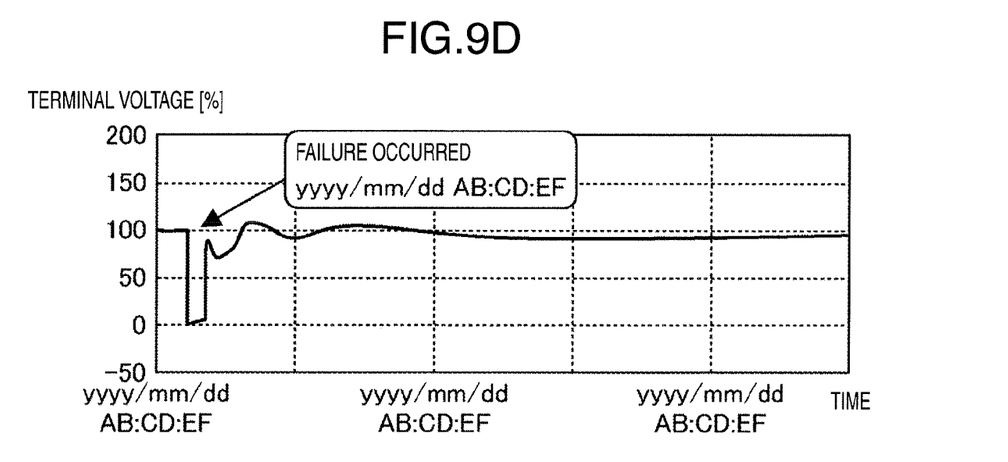
FIG. 9D shows an example of the display screen that is a screen interface of the device in the first embodiment of the present invention.

That is, when a terminal voltage [%] shown in FIG. 9D decrease due to the occurrence of a failure, then as shown at points E and F at the time instance $t_C$ of FIGS. 5A, 5B, the power conditioning system 50 stops to operate (the power conditioning system output [p.u.]=0.00) and will maintain this stop state until a command to return is given. If the power conditioning system 50 has been shut off, the flow proceeds to Step S52, while if not, the flow returns to Step S50. In Step S52, the return pattern information 340 transmitted by the communication section 29 via the communication network 300 from the planning server 10 is received, and stored into the normal input database 31. In Step S53, it is determined whether or not there is no abnormality in the received information received in Step S52. Here, the abnormality in the receipt information refers to a case where the return pattern information cannot be received due to a transmission delay or the like although it is determined in Step S51 that the power conditioning system has been shut off, or a case where the gate block time of the return pattern information does not match the shut-off time of the power conditioning system. If there is no abnormality, the flow proceeds to Step S54, a gate block limiter command value of the power conditioning system is prepared from the return pattern information 340 received in Step S52, and is held in the RAM 28. In Step S55, the gate block limiter command value of the power conditioning system held in the RAM 28 is transmitted to the power conditioning system 50 by the communication section 30 by using the power conditioning system output control program. Moreover, if there is any abnormality, the flow proceeds to Step S56, the gate block limiter command value of the power conditioning system is prepared from the emergency return pattern information, which is stored in advance into the emergency input database 32 by a user using the input section 25, and is held in the RAM 28. In Step S57, the gate block limiter command value of the power conditioning system held in the RAM 28 is transmitted to the power conditioning system 50 by the communication section 30 by using the power conditioning system output control program. In Step S58, the return pattern information log data held in the RAM 28 and transmitted to the power conditioning system 50 is stored into the log database 35, and then the flow is complete.

Next, an example of the return pattern display of the power conditioning system is described using FIGS. 7A, 7B, FIGS. 8A, 8B, and FIGS. 9A-9D. FIGS. 9A-9D are explanatory views showing a display example onto the display device 11 of the return pattern calculation result of the power conditioning system. Here, the display onto a display screen is considered. A frequency deviation in the isolated power system and a time-series waveform of the power conditioning system output before and after the return pattern calculation of the power conditioning system are displayed in contrast on the screen. Moreover, a time-series waveform of the node voltage V is also displayed, and the return operation status of the power conditioning system is displayed together with each time instance. By displaying in this manner, "when has a failure occurred?" and/or the return pattern calculation result of the power conditioning system can be clearly transmitted to a user.

Figure 7A:
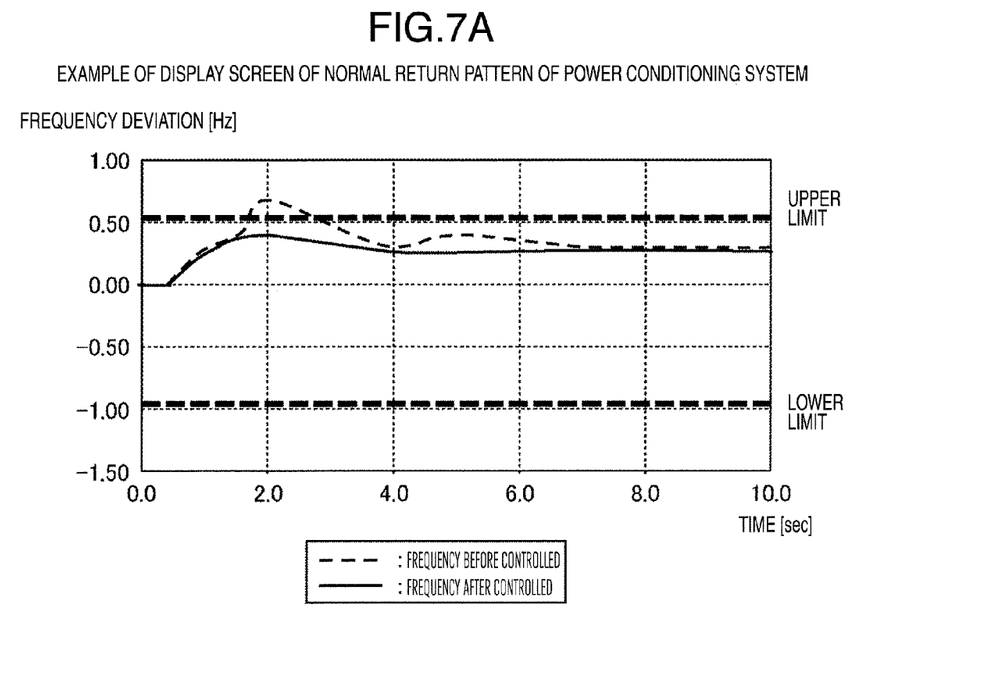
FIG. 7A shows an example of a display screen that is a simple example of an effect of normal input data in the first embodiment of the present invention.
Figure 7B:
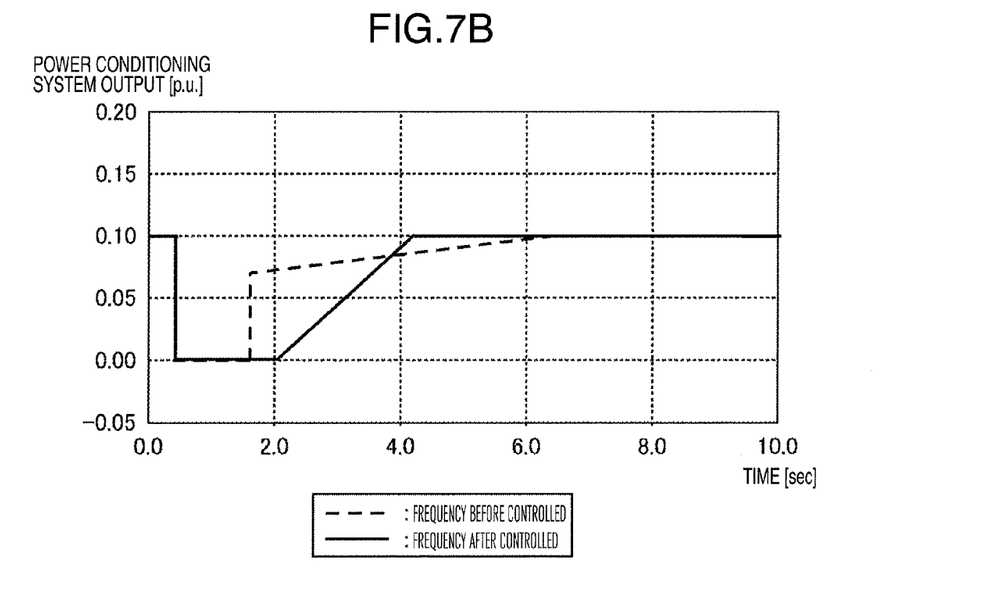
FIG. 7B shows an example of a display screen that is a simple example of the effect of the normal input data in the first embodiment of the present invention.
Figure 8A:
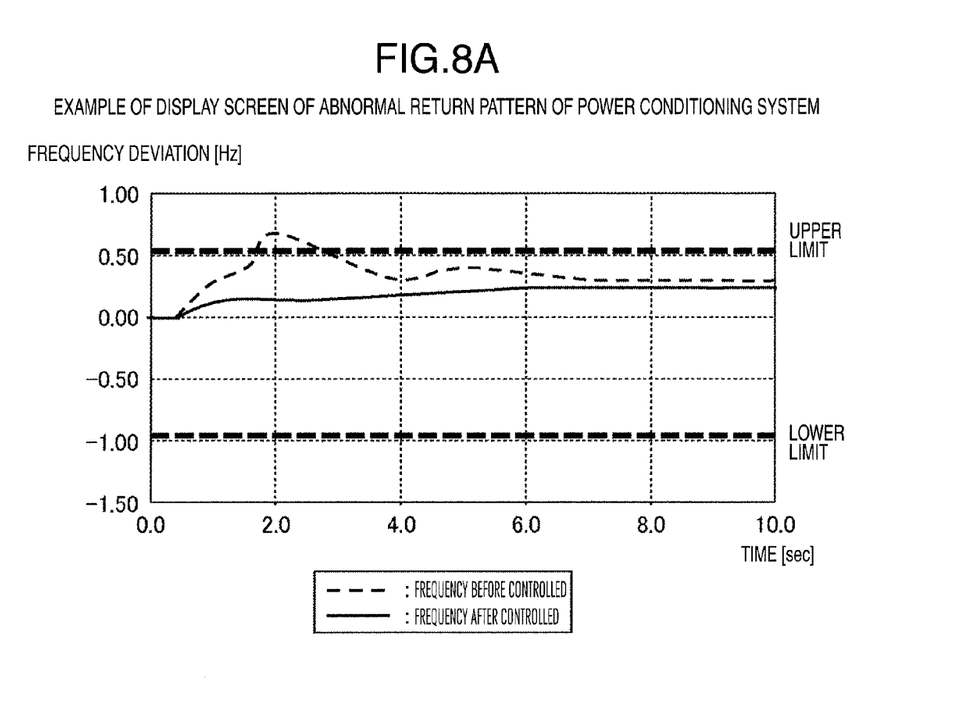
FIG. 8A shows an example of a display screen that is a simple example of an effect of abnormal input data in the first embodiment of the present invention.
Figure 8B:
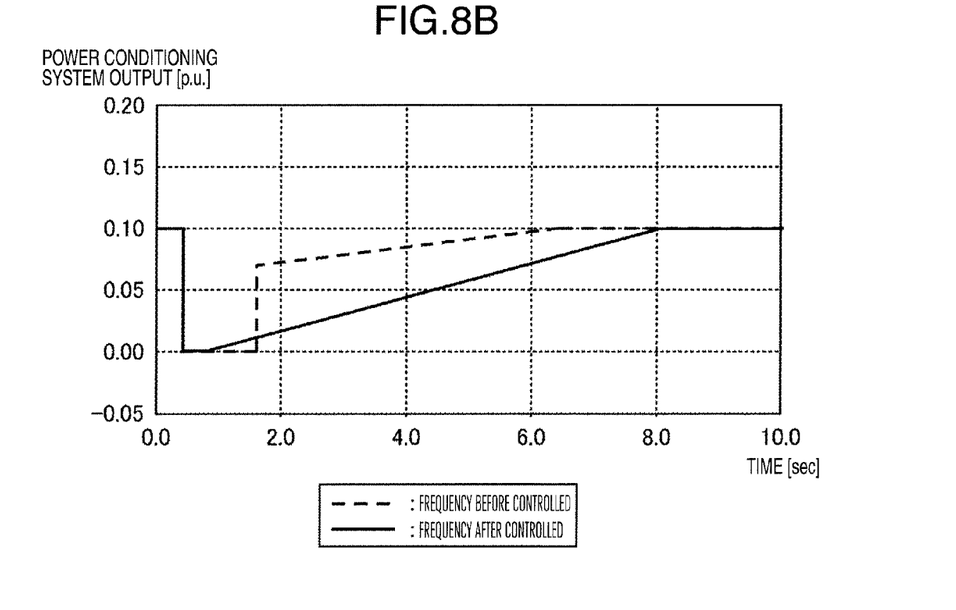
FIG. 8B shows an example of a display screen that is a simple example of the effect of the abnormal input data in the first embodiment of the present invention.

Here, an example of outputting to the screen is shown, but the above-described information may be provided to a user as the data in a format printable onto a document or the like. Moreover, FIGS. 7A, 7B show an example (the frequency deviation and the output of the power conditioning system) of the display screen of normal return pattern information, while FIGS. 8A, 8B show an example (the frequency deviation and the output of the power conditioning system) of the display screen of abnormal return pattern information.

Figure 10:
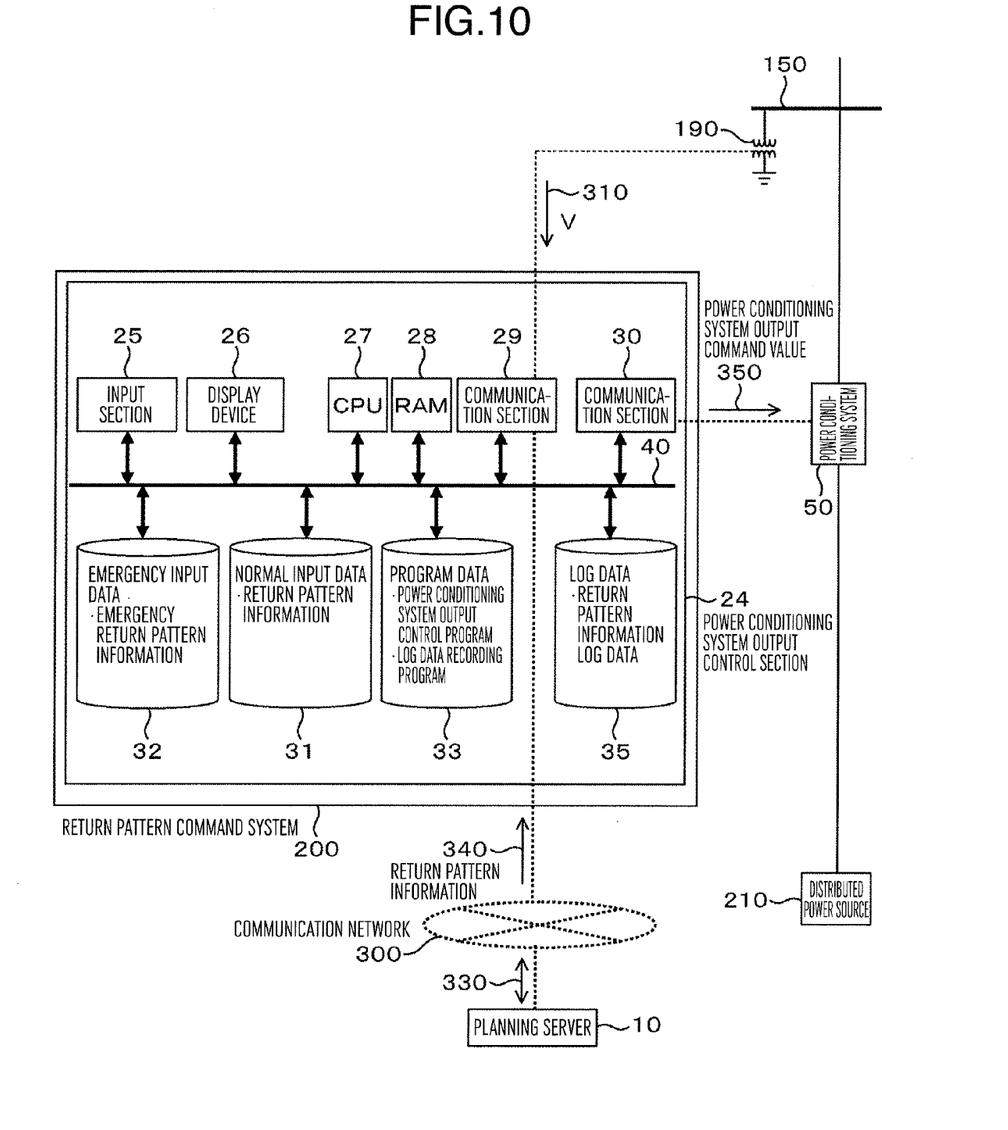
FIG. 10 shows a return pattern command system in a second embodiment of the present invention.

Next, FIG. 10 is a view showing a second embodiment of the present invention. The second embodiment differs from the first embodiment in that the return pattern command system and the power conditioning system are separated. That is, in FIG. 1, the power conditioning system output control section 34 and the power conditioning system 50 are included in the return pattern command system 200, while in FIG. 10, only the power conditioning system output control section 34 is included in the return pattern command system 200. This has an advantage in that if a power conditioning system output command value 350 is transmitted to the power conditioning system 50 by the communication section 30 of the power conditioning system output control section 34, then the effect of the present invention can be exhibited and the return pattern command system 200 can be installed at any place.

Next, a third embodiment is described. The third embodiment is characterized in that the calculation of the return pattern. Because other configurations and the steps of calculation are the same, the description thereof is omitted.

Because the voltage is oscillating after removing an accident, the following determination and calculation are performed by using a voltage, which is obtained by removing the oscillation component through a filter.

Figure 11A:
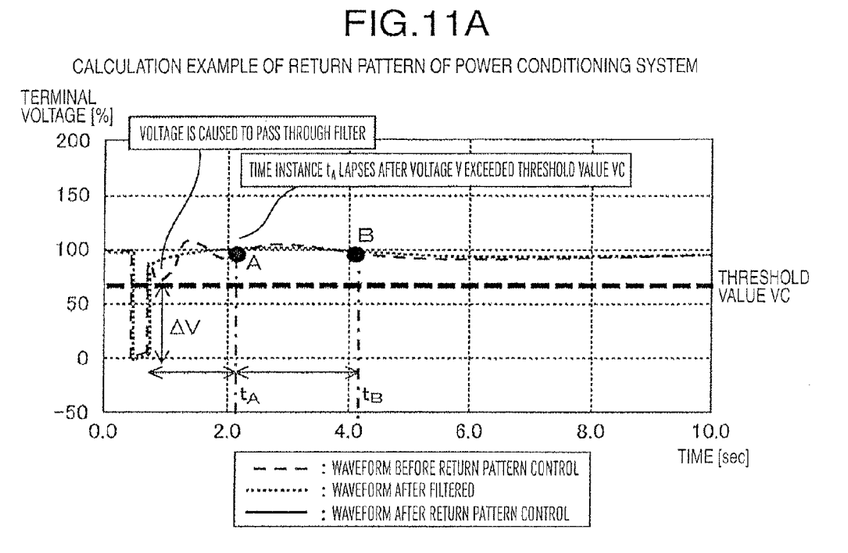
FIG. 11A shows an example of the display screen that is an example of the return pattern in a third embodiment of the present invention.
Figure 11B:
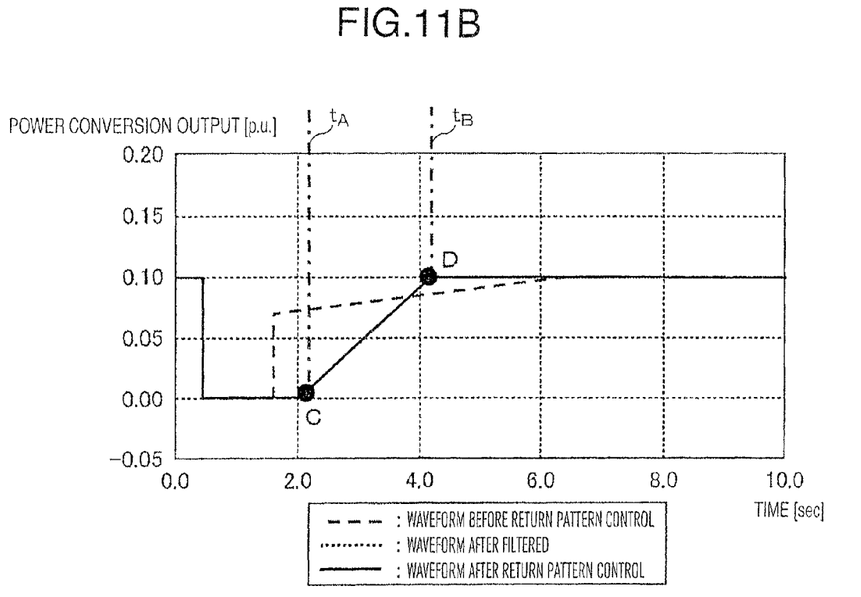
FIG. 11B shows an example of the display screen that is an example of the return pattern in the third embodiment of the present invention.

That is, the return pattern is prepared from a variation $\Delta V$ of the voltage V and a time instance t. FIGS. 11A, 11B show an example of the display screen of an example of the calculation (the frequency deviation and the output of the power conditioning system) of the return pattern of the power conditioning system in the embodiment. As shown in FIGS. 11A, 11B, in order for the voltage to return, the accident needs to be removed. Then, the return pattern is formed so that the voltage recovers to a threshold value VC (e.g., 70%) after removing this accident, and after a lapse of $t_A$ (e.g., 2.1) seconds, the outputting of the power conditioning system starts, and then prior to a lapse of $t_B$ (e.g., 4.1) seconds the output of the power conditioning system recovers to 100% (0.1 p.u. in the view).

The above description has been made with regard to the embodiments, but the present invention is not limited thereto, and it is clear to those skilled in the art that various kinds of changes and modifications can be made within the spirit of the present invention and the scope of the attached claims.

INDUSTRIAL APPLICABILITY

The present invention is useful in a power conditioning system coupled to a photovoltaic generation device, a wind power generation device, or the like, the power conditioning system being capable of introducing a photovoltaic generation device, a wind power generation device, or the like so as not to affect a system fluctuation in the frequency or the like in the event of a system failure, and is also useful in a control equipment for the power conditioning system and a control method for the power conditioning system.

The invention claimed is:

1. A power conditioning system that converts a generated power based on renewable energy and supplies the resulting electric power to an electric power system, the power conditioning system comprising:
   an output suppression control section that reduces an output based on fluctuation information of the electric power system;
   a return control section that increases the output in a predetermined return pattern after the output decreases, wherein the return pattern is formed so as to be variable by external instruction information;
   a receiver that receives the return pattern as the instruction information; and
   a filter that removes a short-period oscillation;
   wherein the return control section increases the output according to the received return pattern;
   wherein the return pattern is calculated based on an estimation of a frequency time-series waveform made by a frequency fluctuation simulation; and
   wherein a transient stability analysis is performed and a result thereof is caused to pass through the filter to remove the short-period oscillation of the result, and a frequency time-series waveform is calculated based on a filtered result of the transient stability analysis;
   the return control section:
   estimating the frequency time-series waveform made by the frequency fluctuation simulation in an isolated power system when the isolated power system is generated due to a system failure, and transmitting return pattern information based on the estimation;
   calculating a plurality of inflection points of the frequency time-series waveform in calculating the return pattern information; and
   calculating the first two points among the inflection points; and calculating return pattern information for causing an output between a time instance of the first inflection point and a time instance of the second inflection point to monotonically increase so as to set an output condition of the power conditioning system at the time instance of the first inflection point to zero and set the output condition of the power conditioning system at the time instance of the second inflection point to a positive output.

2. The power conditioning system according to claim 1, wherein when the instruction information cannot be obtained, the return control section increases the output in a predetermined return pattern.

3. The power conditioning system according to claim 2, further comprising a database for storing return pattern information, wherein the predetermined return pattern is formed based on information of the database.

4. A control equipment of a power conditioning system, the control equipment controlling the power conditioning system that converts a generated power based on renewable energy and supplies a resulting electric power to an electric power system, the control equipment comprising:
   a return pattern generation section that prepares return pattern information so as to increase an output of the power conditioning system in a predetermined return pattern after a decrease in the output of the power conditioning system associated with fluctuation information of the electric power system;
   a transmitter transmitting the return pattern information;
   a receiver that receives the return pattern information as instruction information; and
   a filter that removes a short-period oscillation;
   wherein the return pattern generation section increases the output according to the received return pattern;
   wherein the return pattern is calculated based on an estimation of a frequency time-series waveform made by a frequency fluctuation simulation; and
   wherein a transient stability analysis is performed and a result thereof is caused to pass through the filter to remove the short-period oscillation of the result, and a frequency time-series waveform is calculated based on a filtered result of the transient stability analysis;
   the control equipment:
   estimating the frequency time-series waveform made by the frequency fluctuation simulation in an isolated power system when the isolated power system is generated due to a system failure, and transmitting the return pattern information based on the estimation;
   calculating a plurality of inflection points of the frequency time-series waveform in calculating the return pattern information; and
   calculating the first two points among the inflection points; and calculating return pattern information for causing an output between a time instance of the first inflection point and a time instance of the second inflection point to monotonically increase so as to set an output condition of the power conditioning system at the time instance of the first inflection point to zero and set the output condition of the power conditioning system at the time instance of the second inflection point to a positive output.

5. A control equipment of a power conditioning system, the control equipment controlling the power conditioning system that converts a generated power based on renewable energy and supplies the resulting electric power to an electric power system, the control equipment comprising:
a return pattern generation section that prepares the return pattern information so as to increase the output of the power conditioning system in a predetermined return pattern after a decrease in the output of the power conditioning system associated with the fluctuation information of the electric power system; and
a transmitter transmitting the return pattern information;
the control equipment:
estimating a frequency time-series waveform by a frequency fluctuation simulation in an isolated power system when the isolated power system is generated due to a system failure; and transmitting the return pattern information based on the estimation;
calculating a plurality of inflection points of the frequency time-series waveform in calculating the return pattern information; and
calculating the first two points among the inflection points; and calculating return pattern information for causing an output between a time instance of the first inflection point and a time instance of the second inflection point to monotonically increase so as to set an output condition of the power conditioning system at the time instance of the first inflection point to zero and set the output condition of the power conditioning system at the time instance of the second inflection point to a positive output.

6. A control method for a power conditioning system, comprising the steps of:
based on fluctuation information of an electric power system, reducing an output that is obtained by converting a generated power based on renewable energy by a power conditioning system; and
upon receipt of external instruction information, after the output decreases, increasing an output of the power conditioning system in a return pattern that is variable based on the instruction information;
supplying an electric power converted by the power conditioning system to an electric power system;
receiving the return pattern as the instruction information;
increasing the output according to the received return pattern;
calculating the return pattern based on an estimation of a frequency time-series waveform made by a frequency fluctuation simulation;
estimating the frequency time-series waveform made by the frequency fluctuation simulation in an isolated power system when the isolated power system is generated due to a system failure, and transmitting the return pattern information based on the estimation;
calculating a plurality of inflection points of the frequency time-series waveform in calculating the return pattern information;
calculating the first two points among the inflection points; and calculating return pattern information for causing an output between a time instance of the first inflection point and a time instance of the second inflection point to monotonically increase so as to set an output condition of the power conditioning system at the time instance of the first inflection point to zero and set the output condition of the power conditioning system at the time instance of the second inflection point to a positive output and
performing a transient stability analysis and causing a result thereof to pass through a filter to remove a short-period oscillation of the result, and calculating a frequency time-series waveform based on a filtered result of the transient stability analysis.

\* \* \* \* \*